(12) United States Patent  
Jonas et al.

(10) Patent No.: US 6,578,915 B2
(45) Date of Patent: Jun. 17, 2003

(54) ADJUSTABLE CHAIR AND METHOD OF USE

(75) Inventors: Arnold P. Jonas, Berievk (NL); Steef Grootes, Eindhoven (NL); Garmt Hofs, Geldrop (NL)

(73) Assignee: Trinitas, Aw Eindhoven (NL)

( * ) Notice: Subject to any disclaimer, the term of this patent is extended or adjusted under 35 U.S.C. 154(b) by 0 days.

(21) Appl. No.: 09/827,530

(22) Filed: Apr. 6, 2001

(65) Prior Publication Data

US 2002/0021036 A1 Feb. 21, 2002

Related U.S. Application Data (63) Continuation-in-part of application No. 09/517,228, filed on Mar. 2, 2000, now abandoned.

(51) Int. Cl.⁷ .................................................. A47C 3/025
(52) U.S. Cl. ........................ 297/284.11; 297/284.3; 297/312; 297/423.19; 297/423.38
(58) Field of Search .................. 297/284.11, 283.1, 297/284.1, 284.3, 311, 312, 338, 423.1, 423.19, 423.2, 423.23, 423.24, 423.26, 423.32, 423.38

(56) References Cited

U.S. PATENT DOCUMENTS

| | | |
|---|---|---|
| 868,633 A | 10/1907 | Armstrong |
| 902,092 A | 10/1908 | Latimer |
| 1,952,963 A | 3/1934 | Batt |
| 2,215,540 A | 9/1940 | Breuer |
| 2,225,818 A | 12/1940 | Brooks |
| 2,248,369 A | 7/1941 | Ludersen |
| 2,912,046 A | 11/1959 | Fuerst |
| 2,943,866 A | 7/1960 | Witter |
| 3,167,351 A | 1/1965 | Butler |
| 3,883,173 A | * 5/1975 | Shephard et al. |
| 4,427,234 A | 1/1984 | Peters |
| 4,465,158 A | * 8/1984 | Yamazaki et al. |
| 4,589,696 A | * 5/1986 | Kanai et al. ........... 297/284.11 |
| 4,629,248 A | * 12/1986 | Mawbey ................. 297/284.11 |
| 4,664,444 A | * 5/1987 | Murphy ................. 297/284.11 |
| 4,690,459 A | 9/1987 | Ullman |
| 4,767,155 A | * 8/1988 | Kousaka et al. .... 297/284.11 X |
| 4,775,185 A | * 10/1988 | Scholin et al. ......... 297/284.11 |
| 5,238,296 A | 8/1993 | Paul |
| 5,352,020 A | 10/1994 | Wade |
| 5,362,128 A | * 11/1994 | Wildern, IV |
| 5,833,708 A | 11/1998 | Czaplak |

FOREIGN PATENT DOCUMENTS

| | | | |
|---|---|---|---|
| GB | 2165145 | * 4/1986 | ............ 297/284.11 |
| JP | 36732 | * 3/1983 | ............ 297/284.11 |

* cited by examiner

Primary Examiner—Laurie K. Cranmer
(74) Attorney, Agent, or Firm—Townsend and Townsend and Crew LLP (57) ABSTRACT

An adjustable chair device and method of use for supporting a user in either a traditional seated position in which a pair of legs of the user rest upon a floor, or in a relaxed seated position in which the legs of the user are supported above the floor, provides a base supporting an aft cushion assembly, a forward cushion assembly, and an upwardly extending seat back which cooperate to support the user in a seated position. The forward cushion assembly is adjustably attached to the aft cushion assembly with an adjustment assembly that allows both horizontal and vertical adjustment of the forward cushion assembly.

19 Claims, 5 Drawing Sheets

ADJUSTABLE CHAIR AND METHOD OF USE

CROSS-REFERENCES TO RELATED APPLICATIONS

This application is a continuation-in-part of U.S. patent application Ser. No. 09/517,228, filed Mar. 2, 2000 now abandoned, the complete disclosure of which is herein incorporated by reference.

BACKGROUND OF THE INVENTION

1. Field of the Invention

This invention relates generally to adjustable chairs, and more particularly to an adjustable chair device for supporting a user in either a traditional seated position in which the legs of the user rest upon the floor, or in a relaxed seated position in which the legs of the user are lifted off the floor.

2. Description of Related Art

Various devices have been developed to support the human body in a restful and comfortable position. Ullman, U.S. Pat. No. 4,690,459, teaches a working chair that supports the person seated in the chair by both the ischium and the lower thighs. Czaplak, U.S. Pat. No. 5,833,708, teaches a posture support device that supports the user's thighs to correctly position the user's spine in a squatting posture.

Traditional chair devices provide leg and foot supports to comfortably support the user's legs. Examples of such devices are shown in Armstrong, U.S. Pat. No. 868,633 (chair with extensible footrest), Latimer, U.S. Pat. No. 902,092 (extension foot rest), Batt, U.S. Pat. No. 1,952,963 (rocking chair and leg rest), Breuer, U.S. Pat. No. 2,215,540 (chair with leg support), Ludersen, U.S. Pat. No. 2,248,369 (pivoting leg rest for supporting an injured leg), Paul, U.S. Pat. No. 5,238,296 (foot rocker), Wade et al., U.S. Pat. No. 5,352,020 (hydraulic extendable leg rest), Peters, U.S. Pat. No. 4,427,234 (leg rest that supports both the feet and the thighs), Brooks, U.S. Pat. No. 2,225,818 (automobile leg rest that supports the calves of the driver), and Fuerst, U.S. Pat. No. 2,912,046 (adjustable ottoman).

A popliteal support device, shown in Butler, U.S. Pat. No. 3,167,351, discloses a device useful in automobiles to provide additional support to the popliteal region (behind the knee) of the user's legs while driving. While this device supports the popliteal region of the user's legs, this device can't be adjusted to support the user's legs off the ground. Similar to Butler, various chairs disclosed in the prior art include a front cushion that is pivotally attached to the base of the chair, thereby enabling the front cushion to pivot upwards for supporting the legs of the user. Examples are shown in Scholin et al., U.S. Pat. No. 4,775,185, Mawbey, U.S. Pat. No. 4,629,248, and Kousaka, U.S. Pat. No. 4,767,155. These automobile seats are only designed to provide partial support to the legs of the user. These seats are not designed to lift the legs of the user off the ground; and indeed, since the driver of the automobile will be sitting in these seats, they cannot be designed to lift the legs of the user off the ground, or the user would not be able to operate the gas pedal and the brake of the vehicle.

The only device that teaches lifting a user's legs off of the ground is the protective device disclosed in Witter, U.S. Pat. No. 2,943,866. This device is not designed to support the user's legs in a more comfortable position for traveling, but to thrust the user's knees upwards in the event of an automobile accident.

The devices shown in the prior art do not offer maximum comfort for a passenger, especially a passenger in a bus or airplane where there is little space available for the legs of the passenger. The very limited space between the airplane or bus seat-rows does not leave much legroom. Several airlines have been dealing seriously with this issue, investing tens of millions of dollars in attempts to add a little room (4 inches) to passenger legs. However, this would not solve the real cause for passenger suffering, which is the prolonged, motionless sitting in an unsuitable chair, rather than lack of leg room. Another disadvantage of the above-described devices is that users with long legs often do not receive sufficient support under their lower thighs, an important aspect of comfort to the user. The lack of movement resulting from being confined to one's seat might contribute to medical conditions such as deep-vein thrombosis, a condition which can be fatal.

An advantage of the present chair device is that it may mitigate the danger of the phenomenon called "Economy-Class-Syndrome" (deep-vein thrombosis). The functional adjustability of the chair device, according to the present invention, considerably improve passenger physical well-being and facilitate travelling considerably. A passenger can change his or her sitting angle by lifting his or her legs to various heights, and even lift his or her legs completely from the floor of the aircraft, bus, or other vehicle. The mere lifting of the legs off the floor reduces muscle pressure and tension, significantly improving the passenger's feeling of well-being. The narrow passage between two rows of seats poses no problem to users of the new chair device since the seat is especially designed to operate in these limited spaces. Even tall passengers can enjoy the features of the chair device.

The prior art teaches the desirability of properly supporting the legs of a user while the user is in a seated position. However, the prior art does not teach a chair device that can be vertically adjusted to support the user's legs off of the floor. The present invention fulfills these needs and provides further related advantages as described in the following summary.

SUMMARY OF THE INVENTION

The present invention teaches certain benefits in construction and use which give rise to the objectives described below.

The present invention provides an adjustable chair device and method of use for supporting a user in either a traditional seated position in which a pair of legs of the user rest upon a floor, or in a relaxed seated position in which the legs of the user are supported above the floor. The chair device includes a base supporting an aft cushion assembly, a forward cushion assembly, and an upwardly extending seat back which cooperate to support the user in a seated position. The forward cushion assembly is adjustably attached to the aft cushion assembly. The chair device further includes a means for adjusting the vertical position of the forward upwardly facing surface, with respect to the aft upwardly facing surface, such that the legs of the user are supported off of the ground.

A primary objective of the present invention is to provide an adjustable chair device having advantages not taught by the prior art.

Another objective is to provide a chair device having a means for adjusting the horizontal position of the forward cushion assembly to contact the lower thigh portion of the legs of the user and a means for adjusting the vertical position of the forward cushion assembly, with respect to the aft cushion assembly, to support the legs of the user in either a traditional seated position in which a pair of legs of the user rest upon a floor, or in a relaxed seated position in which the legs of the user are lifted off the floor.

Another objective is to provide a chair device that offers more freedom of movement for the legs of the user without the need of more space. This is particularly advantageous for seats in airplanes and long distance busses where the space for the user's legs is limited as a result of which there is a risk of deep vein thrombosis in the user's legs.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention, an adjustable chair device 20 for supporting a user 10 in either a traditional seated position in which a pair of legs 12 of the user 10 rest upon a floor 18, or in a relaxed seated position in which the pair of legs 12 of the user 10 are supported above the floor 18.

Figure 1:
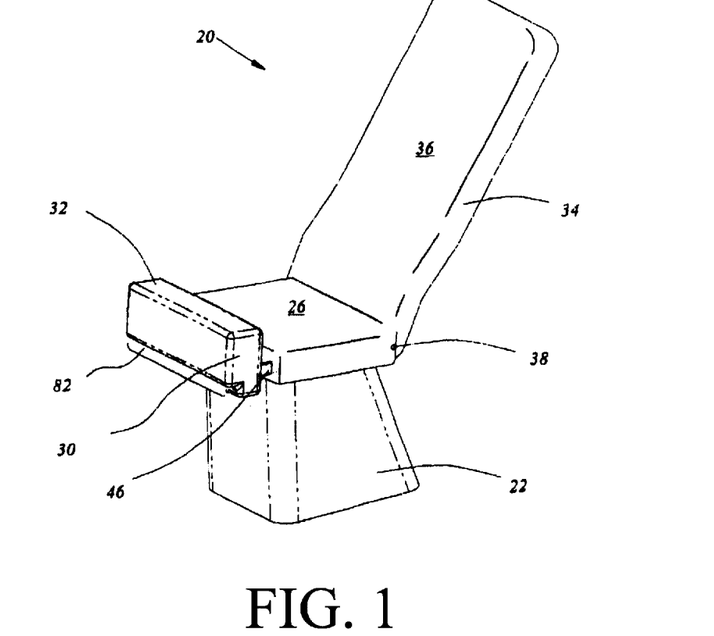
FIG. 1 is a perspective view of a first embodiment of the present invention, a chair device having a base that supports a forward cushion assembly, an aft cushion assembly, and an upwardly extending seat back.

As shown in FIG. 1, the chair device 20 includes a base 22 supporting an aft cushion assembly 24, a forward cushion assembly 30, and an upwardly extending seat back 34. The aft cushion assembly 24 provides an aft upwardly facing surface 26. The forward cushion assembly 30 provides a forward upwardly facing surface 32. The upwardly extending seat back 34 provides a front facing surface 36. The aft upwardly facing surface 26, the forward upwardly facing surface 32, and the front facing surface 36 cooperate to support the user 10 in a seated position, as is described in detail below. The aft cushion assembly 24 is preferably fixedly attached to the base 22, although various adjustable frames can be used in alternative embodiments to add further adjustability to the chair device 20. The upwardly extending seat back 34 is preferably attached to the aft cushion assembly 24 with a seat back hinge 38, although in an alternative embodiment (not shown) the seat back hinge 38 is attached directly to the base 22. The forward cushion assembly 30 is adjustably attached to the aft cushion assembly 24 as described in more detail below. Typical seats having generally similar construction are disclosed in Scholin et al., U.S. Pat. No. 4,775,185, and Mawbey, U.S. Pat. No. 4,629,248, which are hereby incorporated by reference.

Figure 2:
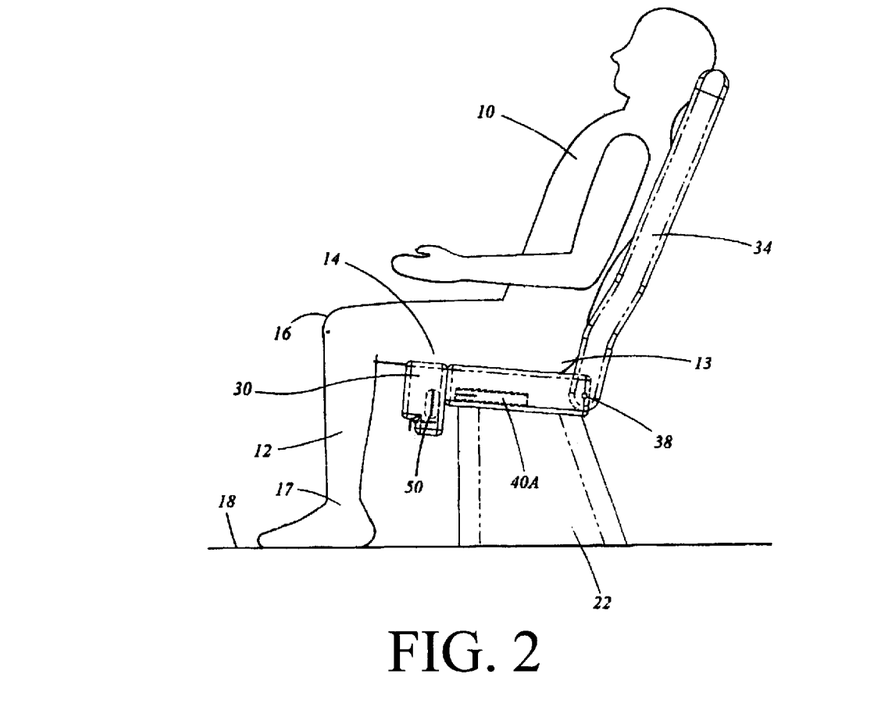
FIG. 2 is a side elevational view of the chair device with the forward cushion assembly in a traditional seated position.

In the traditional seated position, as shown in FIG. 2, the chair device 20 supports the user 10 in a posture wherein the legs 12 of the user 10 rest upon the floor 18. In this position, an ischium 13 (the lower portion of the hipbone) of the user 10 is supported by the aft upwardly facing surface 26, the back of the user 10 is supported by the front facing surface 36, and a thigh 14 of the user 10 is supported by the forward upwardly facing surface 32. While the traditional seated position is comfortable for most purposes, the position can cause great fatigue in the legs 12 of the user 10. The weight of the legs 12 of the user 10 causes stress to knees 16 and ankles 17 of the user 10, and the vibrations of the floor 18 increase the strain on the legs 12. During long journeys, common in airplanes, automobiles, busses, ferries, and other forms of transportation, the fatigue imposed on users 10 can be considerable. Furthermore, there is growing evidence that ordinary seats used in the prior art can cause deep-vein thrombosis, a potentially fatal condition caused by blood pooling and clotting in the legs due to restricting the movement of the legs for long periods of time.

Figure 5:
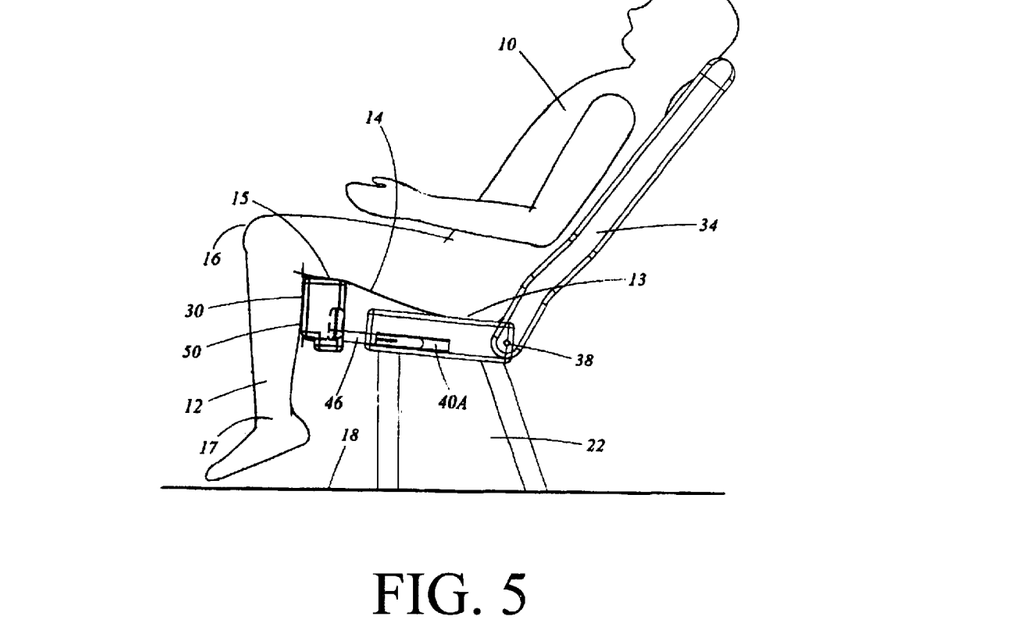
FIG. 5 is a side elevational view of the chair device with the forward cushion assembly in a relaxed seated position.

To overcome the disadvantages of the prior art, the chair device 20 of this invention includes a unique connection between the forward cushion assembly 30 and the aft cushion assembly 24. The forward cushion assembly 30 and the aft cushion assembly 24 are connected with a means for adjusting the vertical position of the forward upwardly facing surface 32 with respect to the floor 18, thereby lifting the legs 12 of the user 10 from the traditional seated position, as shown in FIG. 2, to the relaxed seated position, as shown in FIG. 5. In the relaxed seated position, the legs 12 of the user 10 do not contact the floor 18.

In the preferred embodiment, the chair device 20 further includes a means for adjusting the horizontal position of the forward cushion assembly 30 with respect to the aft cushion assembly 24 so that the forward upwardly facing surface 32 contacts a lower thigh portion 15 of the legs 12 of the user 10, thereby providing the maximum of comfort. The lower thigh portion 15 includes any portion of the leg 12 from the thigh to behind the knees, depending upon the position desired by the user 10 for maximum comfort. It is worth noting that while we specify that the legs 12 of the user 10 do not contact the floor 18, this does not necessarily mean that the legs 12 have no contact with the floor 18 at all. Even in the relaxed seated position the legs 12 of the user 10 might touch the floor 18 to a small extent, depending upon the individual comfort of the user 10. The important consideration is that the substantial portion of the weight is taken off of the legs 12 so that there is no strain on the knees 16 and ankles 17 of the user 10. In the preferred embodiment, there is no contact between the legs 12 of the user 10 and the floor 18, because this avoids the transmission of vibrations from the floor 18 to the legs 12.

In a first embodiment shown in FIGS. 1–6, the vertical position adjusting means and the horizontal position adjusting means are provided by an adjustment assembly 40 that allows both horizontal and vertical adjustment of the forward cushion assembly 30. The adjustment assembly 40 includes a horizontal slide bar guide 40A mounted on the aft cushion assembly 24, and a slide frame 44 that has a horizontally extending horizontal slide bar 46 and a vertically extending vertical slide bar guide 40B. The horizontal slide bar 46 slidably engages the horizontal slide bar guide 40A for horizontal adjustment of the slide frame 44. The adjustment assembly 40 further includes a vertical slide bar 48 mounted on the forward cushion assembly 30. The vertical slide bar 48 slidably engaging the vertical slide bar guide 40B for vertical adjustment of the forward cushion assembly 30. The adjustment assembly 40 is preferably constructed of a strong, rugged, rigid material such as steel or aluminum.

Figure 3:
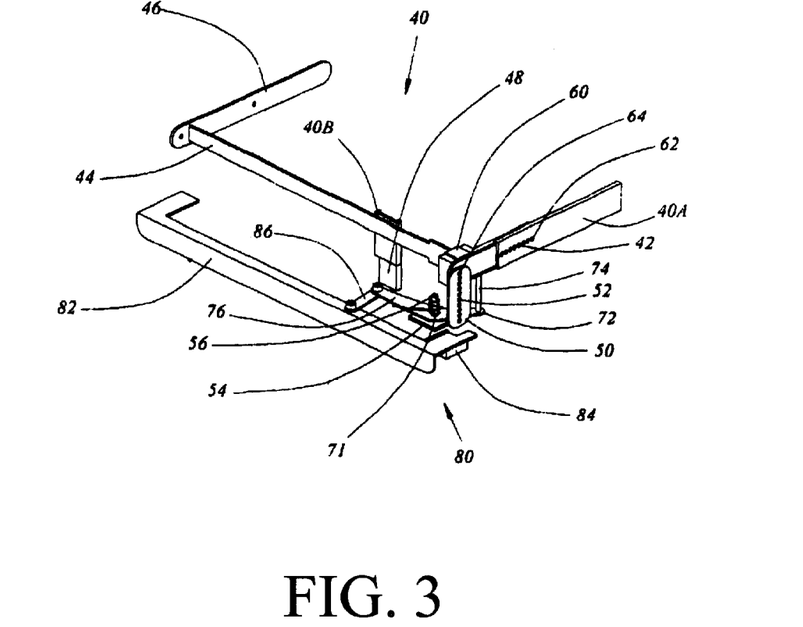
FIG. 3 is a perspective view of an adjustment assembly that adjustably connects the forward cushion assembly to the aft cushion assembly.
Figure 4:
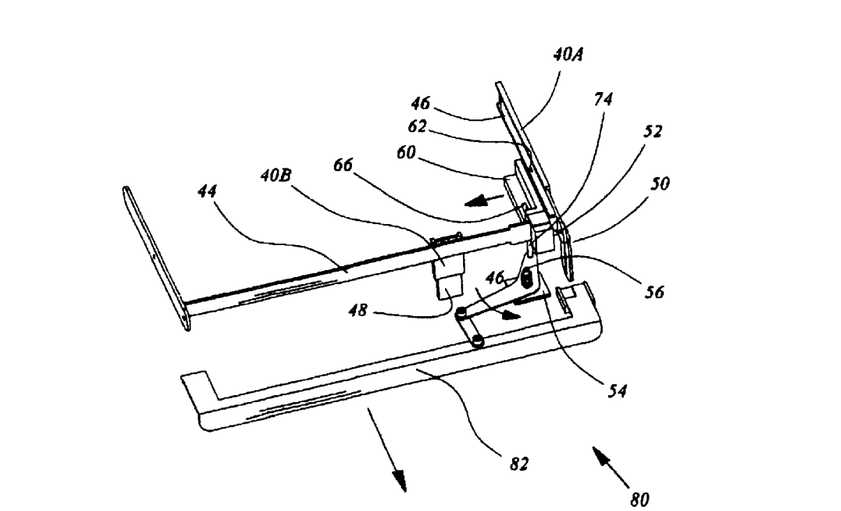
FIG. 4 is a second perspective view of the adjustment assembly.

The adjustment assembly 40 further includes a locking mechanism 60 that locks the forward cushion assembly 30 into a selected position. The locking mechanism 60 is capable of being moved from a locked position to an unlocked position for adjustment of the forward cushion assembly 30; but a biasing means for biasing the locking mechanism 60 from the unlocked position to the locked position, thereby preventing further movement of the forward cushion assembly 30. The locking mechanism 60 further includes a horizontal pin 62, a vertical pin 64. In the locked position, the horizontal pin 62 removably engages one of a plurality of horizontal locking holes 42 in the horizontal slide bar guide 40A; and the vertical pin 64 removably engages one of a plurality of vertical locking holes 52 in a forward slide plate 50 attached to the forward cushion assembly 30.

The biasing means is preferably a spring 71 operably attached to both a bell crank 72 and a bell crank mounting plate 54. The bell crank mounting plate 54 is preferably fixedly mounted on the forward cushion assembly 30. The bell crank mounting plate 54 preferably includes a bell crank pivot point 56 upon which the bell crank 72 is pivotally mounted. The bell crank 72 has a bell crank pin 74 that engages a locking slot 66 of the locking mechanism 60. In use, the spring 71 biasing the bell crank 72 such that the bell crank pin 74 biases the locking mechanism 60 towards the locked position.

The locking mechanism 60 further includes an unlocking means 80 for overcoming the bias of the spring 71 to move the locking mechanism 60 from the locked position to the unlocked position, wherein the horizontal and vertical pins 62 and 64 are pulled from the horizontal and vertical locking holes 42 and 52, respectively, thereby allowing the relative horizontal and vertical position of the forward cushion assembly 30 to be adjusted. Release of the unlocking means 80 allows the spring 71 to return the locking mechanism 60 to the locked position. The unlocking means 80 preferably includes a handle 82 slidably mounted on a handle guide 84 of the forward cushion assembly 30. The handle 82 is pivotally attached to a lever arm 76 of the bell crank 72 with a handle link 86 such that pulling the handle 82 causes the handle link 86 to pull the lever arm 76. The lever arm 76 causes the bell crank 72 to rotate about the bell crank pivot point 56 against the bias of the spring 71, thereby causing the bell crank pin 74 to move the locking mechanism 60 towards the unlocked position.

Figure 7:
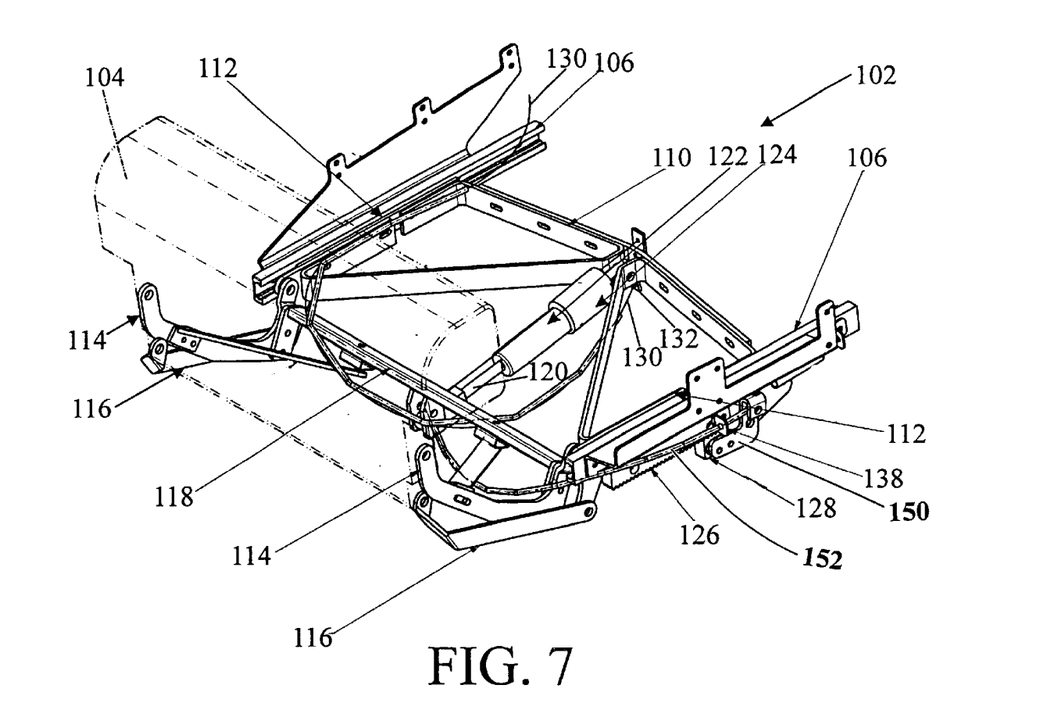
FIG. 7 is a perspective view of a second embodiment of the adjustment assembly of the forward cushion assembly.

In a second, preferred embodiment of the chair device 100, as shown in FIGS. 7–11, the adjustment assembly 102 of the forward cushion assembly 104 has a different construction. In FIG. 7 the adjustment assembly 102 of the forward cushion assembly 104 of this embodiment is shown. For horizontal adjustment of the forward cushion assembly 104 the adjustment assembly 102 again comprises a horizontal slide bar guide 106 mounted on the aft cushion assembly 108 (see FIG. 8) and a slide frame 110 having a horizontal slide bar 112 that slidably engages the horizontal slide bar guide 106 for horizontal adjustment of the slide frame 110. The horizontal control of the forward cushion assembly 104 is substantially similar to the first embodiment described above.

For vertical adjustment of the forward cushion assembly 104 the adjustment assembly 102 comprises a different mechanism. The adjustment assembly 102 includes at least one vertical support arm 114, preferably two vertical support arms located at either end of the forward cushion assembly 104. In the preferred embodiment, the adjustment assembly 102 further includes two additional support arms 116 for supporting and stabilizing the forward cushion assembly 104. The two vertical support arms 114 and the two additional support arms 116 are pivotally connected to both the forward cushion assembly 104 and the slide frame 110. The two vertical support arms 114 and the two additional support arms 116 are constructed of strong and rigid material such as steel, although they are more preferably constructed of a lightweight material such as aluminum when the chair device 20 is designed for use in an airplane.

The two vertical support arms 114 of the chair device 100 are connected to each other via a connecting bar 118. The connecting bar 118 is pivotably connected to a piston 120 of a gas cylinder 122. The piston 120 is preferably pivotally connected to a pair of tabs 119 that extend downwardly from the connecting bar 118. The gas cylinder 122 is pivotably connected to the slide frame 110. The gas cylinder 122 is also attached to a means for vibrating, such as a vibrator 124, for vibrating the forward cushion assembly 104. The vibrator 124 is pivotably conneted to the slide frame 110. In an alternative embodiment, instead of being attached to the gas cylinder 122 the vibrator 124 could also be present in the forward cushion assembly 104. The gas cylinder 122 is similar to other gas cylinders well known in the art, such as Bauer, U.S. Pat. No. 3,711,054, and Claus et al., U.S. Pat. No. 6,116,555, hereby incorporated by reference. Of course, those skilled in the art will recognize that the piston 120 and the gas cylinder 122 can be reversed, or replaced with an equivalent mechanism such as a spring, and such modifications should be considered within the scope of the invention.

Figure 8:
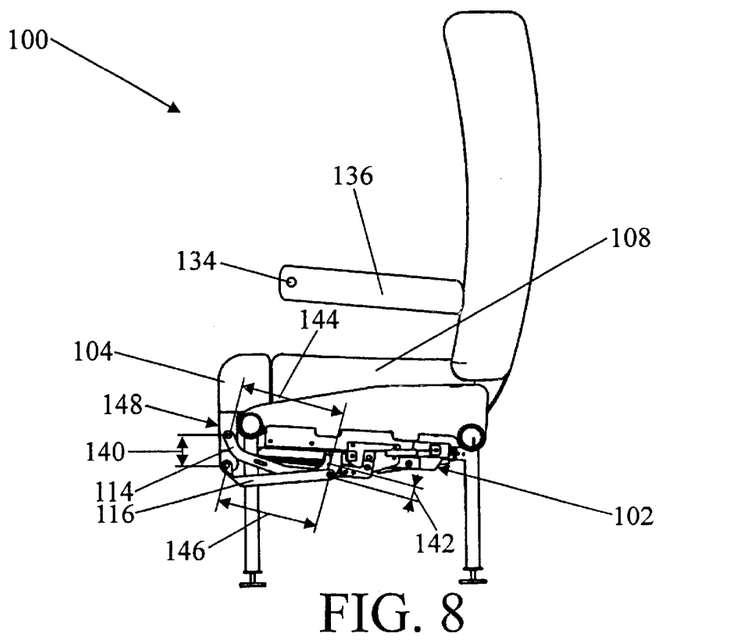
FIG. 8 is a side elevational view of the chair device with the forward cushion assembly in a traditional seated position.

Further the chair device 100 comprises a vertical locking mechanism for blocking the vertical adjustment of the forward cushion assembly 104. The vertical locking mechanism is capable of moving between a locked position in which the movement of the piston 120 with respect to the gas cylinder 122 is blocked and an unlocked position in which the piston 120 can move with respect to the gas cylinder 122. The blocking of the piston 120 to the gas cylinder 122 is operated by a wire 130 which moves a blocking lever 132 connected to the gas cylinder 122. As shown in FIG. 8, the movement of the wire 130 is controlled via a push button 134 on an armrest 136 of the chair device 100.

The chair device 100 further comprises a horizontal locking mechanism for blocking the horizontal adjustment of the forward cushion assembly 104. The horizontal locking mechanism comprises a toothed bar 126 fixed to the slide frame 110 and a toothed piece 128 being movable between a locked position in which it meshes with the toothed bar 126 and blocks the movement of the horizontal slide bar 112 to the horizontal slide bar guide 106, and an unlocked position in which it is free from the toothed bar 126 so that the horizontal slide bar 112 can move with respect to the horizontal slide bar guide 106.

The chair device 100 further comprises a release mechanism which moves the horizontal locking mechanism to the unlocked position and keeps it in the unlocked position in case the forward cushion assembly 104 is in a lifted position higher than a given level. The horizontal locking mechanism preferably includes a horizontal locking lever 150 that is pivotally attached to the slide frame 110. The horizontal locking lever 150 is used to mount the toothed piece 128 adjacent the toothed bar 126 such that pivoting the horizontal locking lever 150 causes the toothed piece 128 to engage or disengage the toothed bar 126. The horizontal locking lever 150 is attached to a second wire 152 which is also attached to the forward cushion assembly 104. In this arrangement, lifting the forward cushion assembly 104 above a given point, to the relaxed seated position, causes the second wire 152 to pull the horizontal locking lever 150 causing it to pivot to the point that the toothed piece 128 disengages the toothed bar 126. The level of the given point can be adjusted by an adjustment screw 138 on the chair device 100. With such a configuration, when forward cushion assembly 104 is in its lowest or traditional seated position (regardless of whether the forward cushion is moved forward), forward cushion assembly 104 is in the locked position. However, when moved to any point above the lowest position, forward cushion assembly 104 is free to pivot.

FIG. 8 shows a side view of the chair device 100 with the forward cushion assembly 104 in a traditional seated position. On one side of the forward cushion assembly 104, the connection points of the vertical support arm 114 and the additional support arm 116 are at a distance 140 from each other. On one side of the slide frame 110, the connection points of the vertical support arm 114 and the additional support arm 116 are at a distance 142 from each other.

As shown in FIG. 8, the vertical support arm 114 is slightly longer than the additional support arm 116; that is, the distance 144 between the connection points of the vertical support arm 114 on one side of the chair device 100 is slightly greater than the distance 146 between the connecting points of the additional support arm 116 on the same side of the chair device 100. In this way, the forward cushion assembly 104 rotates a little bit when moving from the lower position to a lifted position whereby the lower part of the forward cushion assembly moves a little bit to the aft cushion assembly 108 (see FIGS. 10 and 11) so that the front side 148 of the forward cushion assembly 104 does not contact the legs of the user and the user's legs have more freedom of movement.

Figure 9:
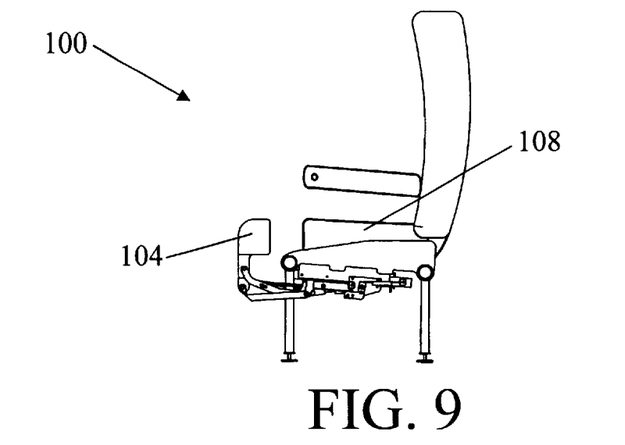
FIG. 9 is a side elevational view of the chair device with the forward cushion assembly in a horizontal displaced position.

The user can extend the length of the chair device 100 by pulling the forward cushion assembly 104 away from the aft cushion assembly 108. FIG. 9 shows the chair device 100 with the forward cushion assembly 104 in a horizontal shifted position. The toothed piece 128 does not engage the toothed bar 126 strong enough to prevent the outward movement, only to slightly restrict the movement.

Figure 10:
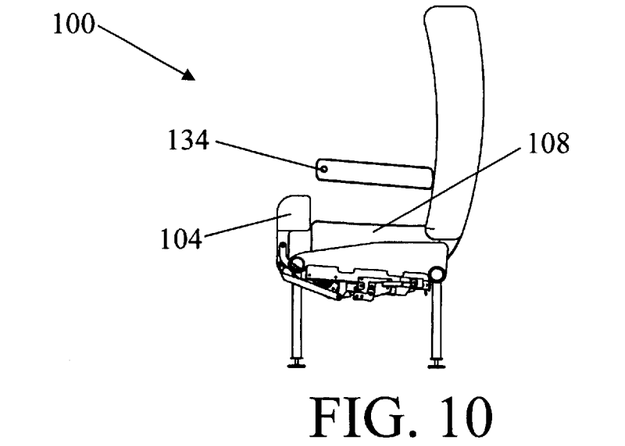
FIG. 10 is a side elevational view of the chair device with the forward cushion assembly in a vertical lifted position.

The user can also change the vertical position of the forward cushion assembly 104 by pressing the push button 134. FIG. 10 shows the chair device 100 with the forward cushion assembly 104 in a vertical shifted position. The user has to lift his legs and the forward cushion assembly 104 will follow under the bias of the gas cylinder 122. When the user releases the push button 134, the forward cushion assembly 104 is locked in place such that further vertical movement is denied.

In the lifted position of the forward cushion assembly 104 (see also FIG. 11), the second wire 152 causes the toothed piece 128 to disengage from the toothed bar 126, thereby allowing unrestricted horizontal movement, which provides the user with greater flexibility and freedom of movement. In this way, the user can put the forward cushion assembly 104 in the horizontal position that is the most comfortable.

Figure 11:
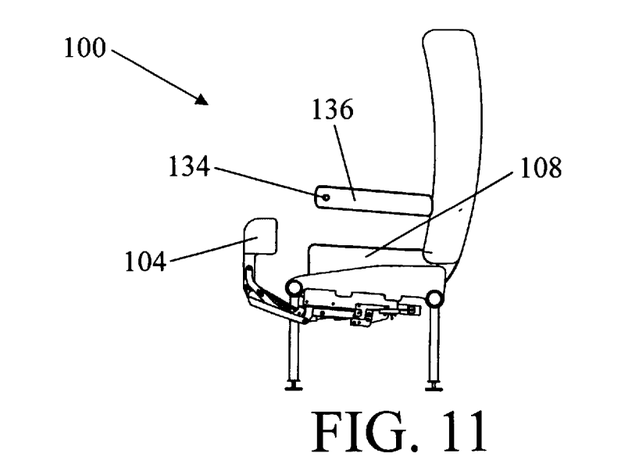
FIG. 11 is a side elevational view of the chair device with the forward cushion assembly in both a horizontal and vertical displaced position.

FIG. 11 shows the chair device 100 with the forward cushion assembly 104 in a relaxed position in which the forward cushion assembly 104 is displaced in both a horizontal and vertical direction. To set the seat back in the traditional seated position the user needs to press the push button 134 on the armrest 136 and push the forward cushion assembly 104 down with the weight of his legs. The user can then push back in the forward cushion assembly 104 until the forward cushion assembly 104 abuts the aft cushion assembly 108.

While the two embodiments of the means for horizontal and vertical adjustment of the chair device 20 have been described in detail, it is recognized that those skilled in the art can devise countless equivalent mechanisms to accomplish the goal of suitably adjusting the forward cushion assembly 30 and the forward upwardly facing surface 32. Structures that are considered equivalent include, but are not limited to pneumatic adjustment devices, motor driven and power assisted devices, and various mechanical adjustment mechanisms such as can be readily devised by those skilled in the art. These equivalent structures should be construed as within the scope of this invention and accordingly within the scope of the claims, below.

Figure 6:
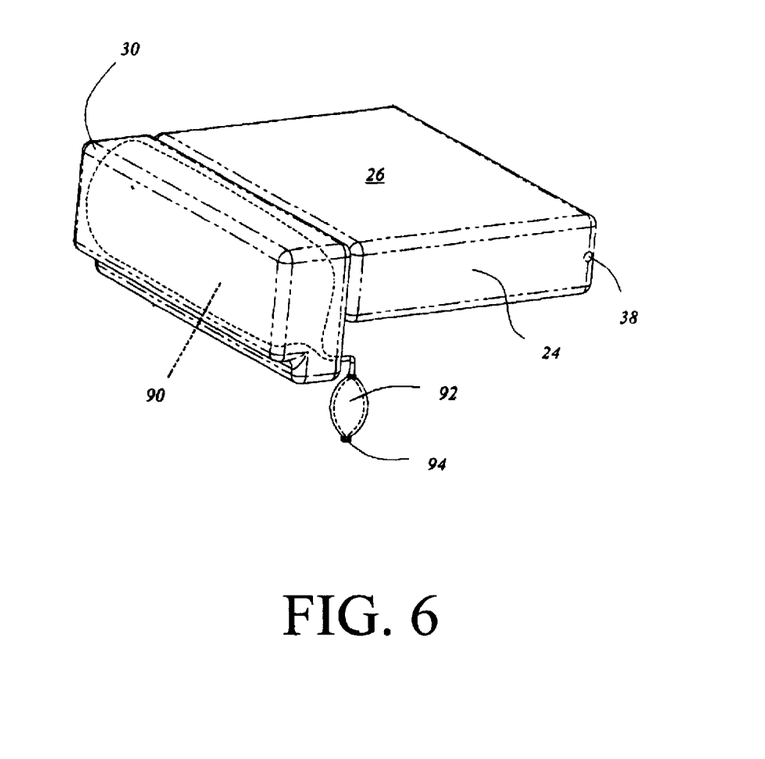
FIG. 6 is a perspective view of an alternative embodiment of the forward cushion assembly wherein the forward cushion assembly further includes an air bladder operably controlled by a hand pump and an air release valve.

In one particular alternative embodiment, as shown in FIG. 6, the vertical position adjusting means is provided by an air bladder 90 mounted within the forward cushion assembly 30 beneath the forward upwardly facing surface 32. The vertical position adjusting means further includes a means for adjusting the volume 92 of the air bladder 90, thereby raising or lowering the forward upwardly facing surface 32. The volume adjusting means 92 is preferably a hand pump used in combination with an air release valve 94. By pumping the hand pump 92, the user 10 is able to inflate the air bladder 90, thereby raising the level of the forward upwardly facing surface 32. By actuating the air release valve 94, the user 10 is able to deflate the air bladder 90, thereby lowering the level of the forward upwardly facing surface 32. The use of the air bladder 90 removes the necessity of many of the above-listed parts of the adjustment assembly 40, although the horizontal slide bar 46 and the horizontal slide bar guide 40A are still preferably included to allow the horizontal adjustment of the forward cushion assembly 30.

The invention includes a method for adjusting the chair device 20 described above to support a user 10 in either a traditional seated position or a relaxed seated position wherein the legs 12 of the user 10 are supported above the floor 18. The chair device 20 is preferably installed upon a floor 18 of an airplane, bus, ferry, or other vehicle that subjects passengers to confinement to the chair device 20 for long periods of time. The user 10 is positioned upon the chair device 20 such that the aft upwardly facing surface 26, the forward upwardly facing surface 32, and the front facing surface 36 cooperating to support the user 10 in a traditional seated position in which a pair of legs 12 of the user 10 rest upon the floor 18. In this position, the ischium 13 of the user 10 is supported by the aft upwardly facing surface 26, the back of the user 10 is supported by the front facing surface 36, and the thigh 14 of the user 10 is supported by the forward upwardly facing surface 32. The traditional seated position allows the user 10 to rest comfortable for much of any given trip.

During long trips, however, the user 10 may begin to experience fatigue in his or her legs 12, as described above. To relieve the strain, and perhaps to attempt to sleep for a period, the user 10 simply adjusts the horizontal position adjusting means to position the forward upwardly facing surface 32 to contact a lower thigh portion 15 of the legs 12 of the user 10; and the user 10 then adjusts the vertical position adjusting means so that the forward upwardly facing surface 32 moves from the traditional seated position to a relaxed seated position, thereby supporting the legs 12 of the user 10 above the floor 18, as shown in FIG. 5.

While the legs 12 of the user 10 are supported above the floor 18, the weight of the legs 12 is removed from the knees 16 and ankles 17, and vibrations from the floor 18 are no longer transmitted through the legs 12 of the user 10. In this position, the user 10 experiences the illusion that his or her legs 12 are actually comfortably supported, as if by an ottoman or similar leg rest, without requiring the additional leg room required by the prior art devices. Indeed, even with the leg room constrains of modem airplanes, the user 10 can be given a comfortable seated position. By further reclining the upwardly extending seat back 34, the user 10 can shift into a sleeping position that allows the user 10 to sleep in comfort.

Although the preferred embodiment has been described above, those skilled in the art will recognize that modifications to the preferred embodiment can be made without altering the basic structure of the invention. For example, in the normal seated position, the forward upwardly facing surface 32 could not be in contact with the user; in this situation the thigh supporting surface could be another surface of the forward cushion assembly 30. In the relaxed seated position the forward cushion assembly 30 could be rotated and lifted, so that the thigh supporting surface would become the forward upward facing surface 32 of the forward cushion assembly 30 that supports the thighs of the user. Other similar modifications should be considered equivalent to the invention as described in the claims.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An adjustable chair device for supporting a user in either a traditional seated position in which a pair of legs of the user rest upon a floor, or in a relaxed seated position in which the legs of the user are lifted with respect to the traditional seated position, the chair device comprising:

a base supporting an aft cushion assembly, a forward cushion assembly, and an upwardly extending seat back;

the aft cushion assembly providing an aft upwardly facing surface, the forward cushion assembly providing a forward upwardly facing surface, and the upwardly extending seat back providing a front facing surface, the aft upwardly facing surface, the forward upwardly facing surface, and the front facing surface cooperating to support the user in a seated position; and a means for adjusting the vertical position of the forward upwardly facing surface, while a user is sitting on the chair, between a first extreme position in which the forward cushion assembly contacts the aft cushion assembly and the forward upward facing surface is at the same vertical level as the aft upward facing surface, and a second extreme position in which the forward upward facing surface is in its entirety at a vertical distance from the aft upward facing surface.

2. The device of claim 1 wherein the vertical position adjusting means adjust the vertical position of the forward cushion assembly to an extent at which the forward cushion assembly is at a vertical distance from the aft cushion assembly.

3. The device of claim 2 further comprising a means for adjusting the horizontal position of the forward cushion assembly with respect to the aft cushion assembly, so that the forward upwardly facing surface is at a distance from the aft cushion assembly and contacts a lower thigh portion of the legs of the user.

4. The device of claim 3 wherein the vertical position adjusting means and the horizontal position adjusting means is provided by an adjustment assembly comprising:

a horizontal slide bar guide mounted on the aft cushion assembly;

a slide frame having a horizontal slide bar that slidably engages the horizontal slide bar guide for horizontal adjustment of the slide frame;

at least one vertical support arm attached to the forward cushion assembly and adjustably attached to the slide frame; and two additional support arms, each of the two additional support arms being pivotally connected to both the forward cushion assembly and the slide frame.

5. The device of claim 4 wherein the distance between the at least one vertical support arm is slightly longer than each of the two additional support arms.

6. The device of claim 4 wherein the at least one vertical support arm includes two vertical support arms, the two vertical support arms being connected to each other via a connecting bar, the connecting bar being pivotably connected to a piston of a gas cylinder, the gas cylinder being pivotably connected to the slide frame.

7. The device of claim 6 further comprising a vertical locking mechanism for blocking the vertical adjustment of the forward cushion assembly, said vertical locking mechanism being capable of moving between a locked position in which the movement of the piston with respect to the gas cylinder is blocked and an unlocked position in which the piston can move with respect to the gas cylinder.

8. The device of claim 7 further comprising a horizontal locking mechanism for blocking the horizontal adjustment of the forward cushion assembly, said horizontal locking mechanism being capable of moving between a locked position in which the movement of the horizontal slide bar to the horizontal slide bar guide is blocked and an unlocked position in which the horizontal slide bar can move with respect to the horizontal slide bar guide.

9. The device of claim 8 further comprising:

a release mechanism which moves the horizontal locking mechanism to the unlocked position and keeps it in the unlocked position in case the forward cushion assembly is in a lifted position higher than a given level; and adjustment means for adjusting the given level.

10. The device of claim 4 wherein the vertical position adjusting means and the horizontal position adjusting means is provided by an adjustment assembly comprising:
   a horizontal slide bar guide mounted on the aft cushion assembly;
   a slide frame having a horizontal slide bar that slidably engages the horizontal slide bar guide for horizontal adjustment of the slide frame, the slide frame further having a vertical slide bar guide;
   a vertical slide bar mounted on the forward cushion assembly, the vertical slide bar slidably engaging the vertical slide bar guide for vertical adjustment of the forward cushion assembly; and
   a locking mechanism capable of moving between a locked position and an unlocked position.

11. The chair device of claim 4 wherein the vertical position adjusting means comprises:
   an air bladder mounted within the forward cushion assembly beneath the forward upwardly facing surface; and
   a means for adjusting the volume of the air bladder, thereby raising or lowering the forward upwardly facing surface.

12. The chair device of claim 11 wherein the volume adjusting means comprises a hand pump and an air release valve.

13. The device of claim 3 wherein the vertical position adjusting means and the horizontal position adjusting means is provided by an adjustment assembly comprising:
   a horizontal slide bar guide mounted on the aft cushion assembly;
   a slide frame having a horizontal slide bar that slidably engages the horizontal slide bar guide for horizontal adjustment of the slide frame;
   at least one vertical support arm attached to the forward cushion assembly and adjustably attached to the slide frame; and
   two additional support arms, each of the two additional support arms being pivotally connected to both the forward cushion assembly and the slide frame.

14. An adjustable chair device for supporting a user in either a traditional seated position in which a pair of legs of the user rest upon a floor, or in a relaxed seated position in which the legs of the user are lifted with respect to the traditional seated position, the device comprising:
   a base supporting an aft cushion assembly, a forward cushion assembly, and an upwardly extending seat back;
   the aft cushion assembly providing an aft upwardly facing surface, the forward cushion assembly providing a forward upwardly facing surface, and the upwardly extending seat back providing a front facing surface, the aft upwardly facing surface, the forward upwardly facing surface, and the front facing surface cooperating to support the user in a seated position;
   a horizontal slide bar guide mounted on the aft cushion assembly;
   a slide frame having a horizontal slide bar that slidably engages the horizontal slide bar guide for horizontal adjustment of the slide frame;
   at least one vertical support arm attached to the forward cushion assembly and adjustably attached to the slide frame; and
   a means for adjusting the vertical position of the forward upwardly facing surface, while a user is sitting on the chair, between a first extreme position in which the forward cushion assembly contacts the aft cushion assembly and the forward upward facing surface is at the same vertical level as the aft upward facing surface, and a second extreme position in which the forward upward facing surface is in its entirety at a vertical distance from the aft upward facing surface.

15. The chair device of claim 14 wherein the means for adjusting the vertical position of the forward cushion assembly is a gas cylinder operably positioned between the slide frame and the at least one vertical support arm, the gas cylinder being pivotally attached to the slide frame and a piston of the gas cylinder being pivotally attached to the at least one vertical support arm, the gas cylinder functioning to lock the at least one vertical support arm in either the traditional seated position or the relaxed seated position in response to a vertical locking mechanism for blocking the vertical adjustment of the forward cushion assembly, the vertical locking mechanism being capable of moving between a locked position in which the movement of the piston with respect to the gas cylinder is blocked and an unlocked position in which the piston can move with respect to the gas cylinder.

16. The chair device of claim 15 wherein the at least one vertical support arm includes two vertical support arms, and the piston of the gas cylinder is pivotally attached to a pair of tabs protruding downwardly from a connecting bar, the connecting bar connecting the two vertical support arms.

17. The chair device of claim 16 wherein the at least one vertical support arm further includes two additional support arms, the two additional support arms each being pivotally connected to both the forward cushion assembly and the slide frame.

18. The chair device of claim 14 further comprising a means for vibrating the forward upwardly facing surface.

19. A method for adjusting a chair device to support a user in either a traditional seated position or a relaxed seated position wherein a pair of legs of the user are supported above a floor, the method comprising the steps of:
   a) providing a chair device comprising:
      a base supporting an aft cushion assembly, a forward cushion assembly, and an upwardly extending seat back;
      the aft cushion assembly providing an aft upwardly facing surface, the forward cushion assembly providing a forward upwardly facing surface, and the upwardly extending seat back providing a front facing surface;
      a means for adjusting the vertical position of the forward upwardly facing surface; and
      a means for adjusting the horizontal position of the forward upwardly facing surface with respect to the aft cushion assembly;
   b) installing the base upon the floor;
   c) positioning the user upon the chair device such that the aft upwardly facing surface, the forward upwardly facing surface, and the front facing surface cooperating to support the user in a traditional seated position in which the legs of the user rest upon the floor;
   d) adjusting the horizontal position adjusting means to position the forward upwardly facing surface to contact a lower thigh portion of the legs of the user; and
   e) adjusting the vertical position adjusting means so that the forward upward facing surface is in its entirety at a vertical distance from the aft upward facing surface.

* * * * *